United States Patent [19]

Bogart et al.

[11] Patent Number: 5,493,114

[45] Date of Patent: Feb. 20, 1996

[54] METHOD OF AND APPARATUS FOR MEASURING THE MOVEMENT OF A LENS WITH FOUR MEASUREMENT POINTS

[75] Inventors: Zac Bogart; Matthew Keennon; Rodney Martinez, all of Santa Barbara, Calif.

[73] Assignee: ZBE, Incorporated, Santa Barbara, Calif.

[21] Appl. No.: 377,904

[22] Filed: Jan. 24, 1995

[51] Int. Cl.⁶ .................................................. H01J 40/14
[52] U.S. Cl. .................................. 250/206.1; 250/559.29; 356/375; 33/701
[58] Field of Search ........................ 250/231.18, 231.16, 250/231.1, 559.37, 559.3, 206.1, 237 R; 356/375, 401; 33/701, 712, 714, 716, 793, 503

[56] References Cited

U.S. PATENT DOCUMENTS 5,150,169  9/1992  Van Wagoner ........................ 356/375
5,365,059  11/1994  Savage ................................ 250/231.1

*Primary Examiner*—Edward P. Westin
*Assistant Examiner*—Que T. Le
*Attorney, Agent, or Firm*—Freilich Hornbaker Rosen

[57] ABSTRACT

A method and apparatus for measuring the linear movement between first and second substantially planar surfaces and is useful, for example, in an automatic focusing system of a photographic enlarging or printing machine. The linear movement between a first plane, e.g., a lens plane and a second plane, e.g., a film or print plane, at a single point, e.g., the lens optical center, is determined by measuring the linear movement of two diametrically opposed points proximate to the lens plane equidistant from the lens optical center. The two measured distances are then averaged to yield a distance measurement at the lens optical center corrected for any deflection of the lens plane.

19 Claims, 3 Drawing Sheets

5,493,114

METHOD OF AND APPARATUS FOR MEASURING THE MOVEMENT OF A LENS WITH FOUR MEASUREMENT POINTS

BACKGROUND OF THE INVENTION

The present invention relates to a method and apparatus for measuring the linear movement between first and second substantially planar structures and is useful, for example, in an automatic focusing system of a photographic enlarging or printing machine.

Photographic enlarging and printing machines are available which automatically move a lens for the purpose of focussing an image. Such machines typically include devices which measure the distance from a film transparency to a lens and the distance from the lens to photographic paper. Using these measurements, the position of the lens to achieve proper focus of the image is calculated and the result is then used to control a motor which moves the lens accordingly. In a high quality machine, it is typically desirable to position the lens extremely precisely, e.g., within 0.0005". To achieve precise positioning, it is desirable to measure the actual position of the lens at its optical center. However, since an image is being projected through the lens, it is not convenient to physically locate a measuring device at the lens optical center since it would interfere with the projected image. It is therefore typical to indirectly measure the lens position as, for example, by measuring the position of some point on the lens support structure intended to move with the lens. For example, some prior art systems measure the position of a motor shaft coupled to the lens support. However, backlash, mechanical play, and distortion of components due to normal operating stresses often introduce errors. In an attempt to minimize such errors, it is common practice to use very precise drive components, excessively heavy structural members, and burdensome assembly and maintenance procedures. All of these factors increase costs and diminish reliability.

Typical prior art systems are disclosed in U.S. Pat. Nos.: 3,832,058; 4,806,988; and Re. 32,424.

SUMMARY OF THE INVENTION

The present invention is directed to a method and apparatus for accurately measuring the linear movement between first and second substantially planar structures.

Preferred embodiments of the invention measure the linear movement between a first plane, e.g., a lens plane, and a second plane, e.g., a film or print plane. In accordance with the invention, linear movement at a single point, e.g., lens optical center, is determined by measuring the linear movement of two diametrically opposed points on the lens plane equidistant from the lens optical center. The two measured distances are then averaged to yield a distance measurement at the lens optical center corrected for any deflection of the lens plane.

Preferred embodiments of the invention are characterized by a first planar surface containing a lens and having first and second measurement points diametrically opposed and equidistant from the lens optical center, a second planar surface for holding a film transparency having third and fourth measurement points diametrically opposed and equidistant from a center point of the transparency, measurement means for measuring movement between the first and third points and second and fourth points, respectively, and averaging means to determine a corrected measurement.

In an alternative embodiment, a single measurement device measures the extension or retraction of a single flexible elongate member routed between the two planes. As a consequence of this routing, the measurement device measures twice the distance of movement between the first and second planes. In this embodiment, a first planar surface containing a lens has first and second measurement points diametrically opposed and equidistant from the lens optical center. A flexible elongate member extends from said first measurement point via directing means to third and fourth measurement points coupled proximate to the second plane and back to the second measurement point proximate to the lens plane.

The novel features of the invention are set forth with particularity in the appended claims. The invention will be best understood from the following description when read in conjunction with the accompanying drawings.

DESCRIPTION OF THE PREFERRED EMBODIMENTS

The present invention relates to a method and apparatus for measuring the linear movement between first and second substantially planar structures and is useful, for example, in an automatic focusing system of a photographic enlarging or printing machine for determining the distance between a lens plane and a film or print plane. In accordance with the invention, linear movement at a single point, e.g., lens optical center, is determined by measuring the linear movement of two diametrically opposed points on the lens plane equidistant from the lens optical center. The two measured distances are then averaged to yield a distance measurement at the lens optical center corrected for any deflection of the lens plane.

Figure 1:
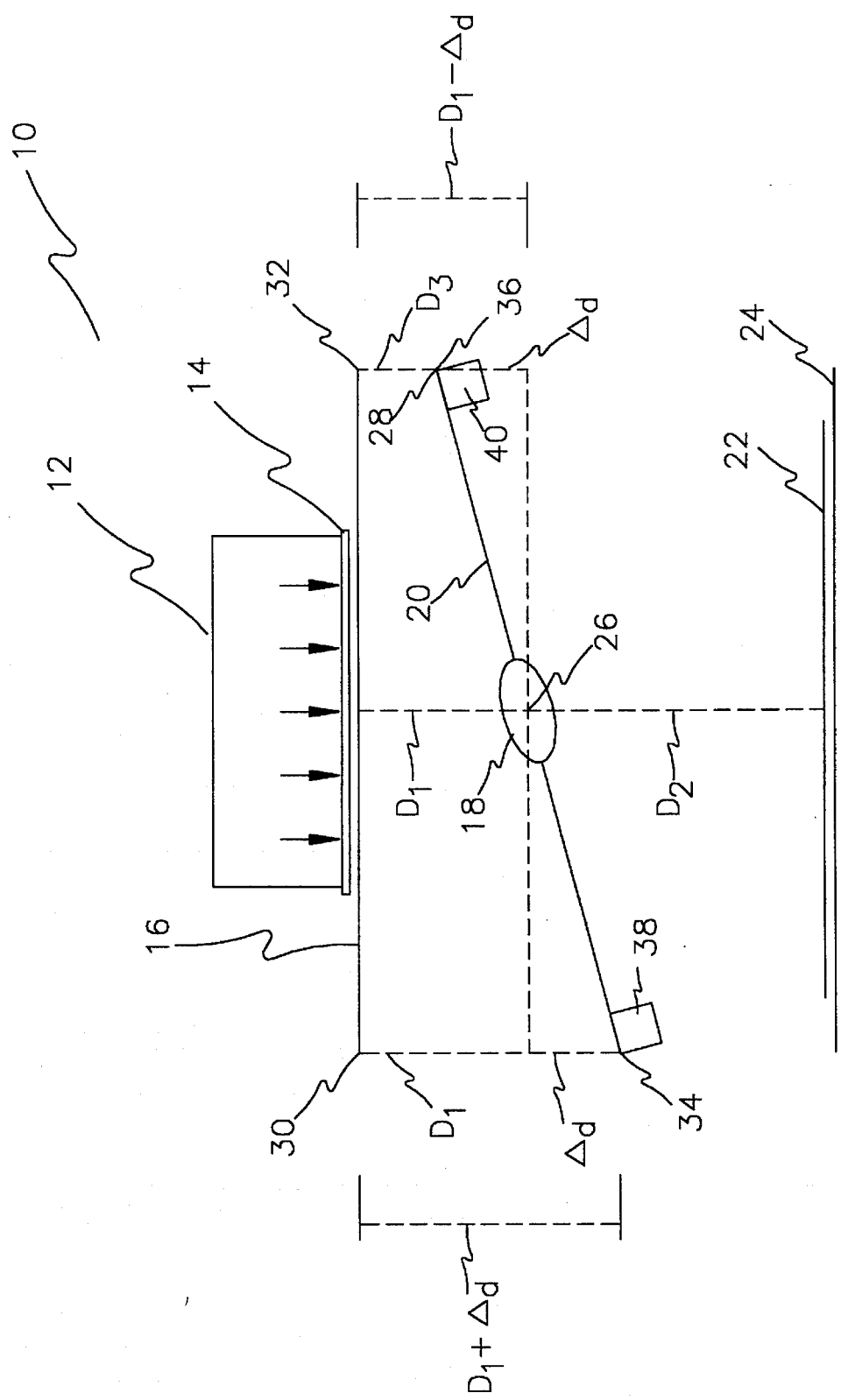
FIG. 1 is a schematic representation of a photographic enlarger or printer showing the two diametrically opposed and equidistant measurement points used by the present invention.

FIG. 1 shows a schematic representation of a photographic enlarger or printer 10 embodying the present invention. A light source 12 illuminates a film transparency 14 placed proximate to a film stage 16. Light from the light source 12 passes through the film transparency 14 and is projected through a lens 18 mounted on a lens board 20 to form a projected image on photographic print material 22 proximate to a print stage 24. The size of the projected image on the photographic print material 22 is determined by the distance $D_2$ between the lens optical center 26 and the photographic print material 22. The distance $D_1$ between the lens optical center 26 and the film transparency 14 proximate to the film stage 16 determines the focus of the projected image on the photographic print material 22. For each possible size of a projected image, there is only one correct focus position. It should be understood that the photographic enlarger 10 shown schematically in FIG. 1 can be constructed to operate in any physical orientation, including upside down, or as a camera with the light source removed and the light traveling from the print material 22 to the film stage 16.

The dimension $D_1$ and consequentially the focus of the projected image is typically adjusted by linearly moving the lens board 20 relative to the film stage 16. Since a measurement device cannot be conveniently placed between the film stage 16 and the lens optical center 26, the dimension $D_1$ is typically indirectly determined in prior art systems by measuring $D_3$ at the outside edge 28. However, due to the effects of backlash, mechanical play and deflection of the components, the dimension $D_3$ will not precisely indicate the dimension $D_1$. Thus the image projected on print material 22 will be degraded.

The present invention measures the distance between the film stage 16 and the lens board 20 at two pairs of points where a first pair of points are diametrically opposed and equidistant from the lens optical center and a matching second pair of points are diametrically opposed and equidistant from the center of the film stage 16. Thus as shown in FIG. 1, diametrically opposed and equidistant points 30 and 32 are selected proximate to the film stage 16 to match diametrically opposed and equidistant points 34 and 36 selected proximate to the lens board 20. Consequentially, lines drawn between points 30, 34 and between points 32, 36 are parallel to the axis through the centers of the lens 18 and the film stage 16. The distance between points 30, 34, as determined by a first measurement device 38, is $D_1+\Delta d$ and the distance between points 32, 36, as determined by a second measurement device 40, is $D_1-\Delta d$. If these two measurements are averaged, the desired dimension $D_1$ results. Alternatively if the measurements are summed, a result of twice the desired dimension $D_1$ results. Although it is desirable that the measurement points 34, 36 be coplanar with the lens 18 and that the measurement points 30, 32 be coplanar with the film stage 16, it is recognized that this may not be always possible. Thus, it is only required that a plane containing measurement points 34, 36 be fixedly offset from the plane containing the lens 18, e.g., the lens board 20, and that the plane containing the measurement points 30, 32 be fixedly offset to the plane containing the film 14, e.g., the film stage 16. A known fixed distance offset reflecting these offsets can then be used in distance calculations.

Figure 2:
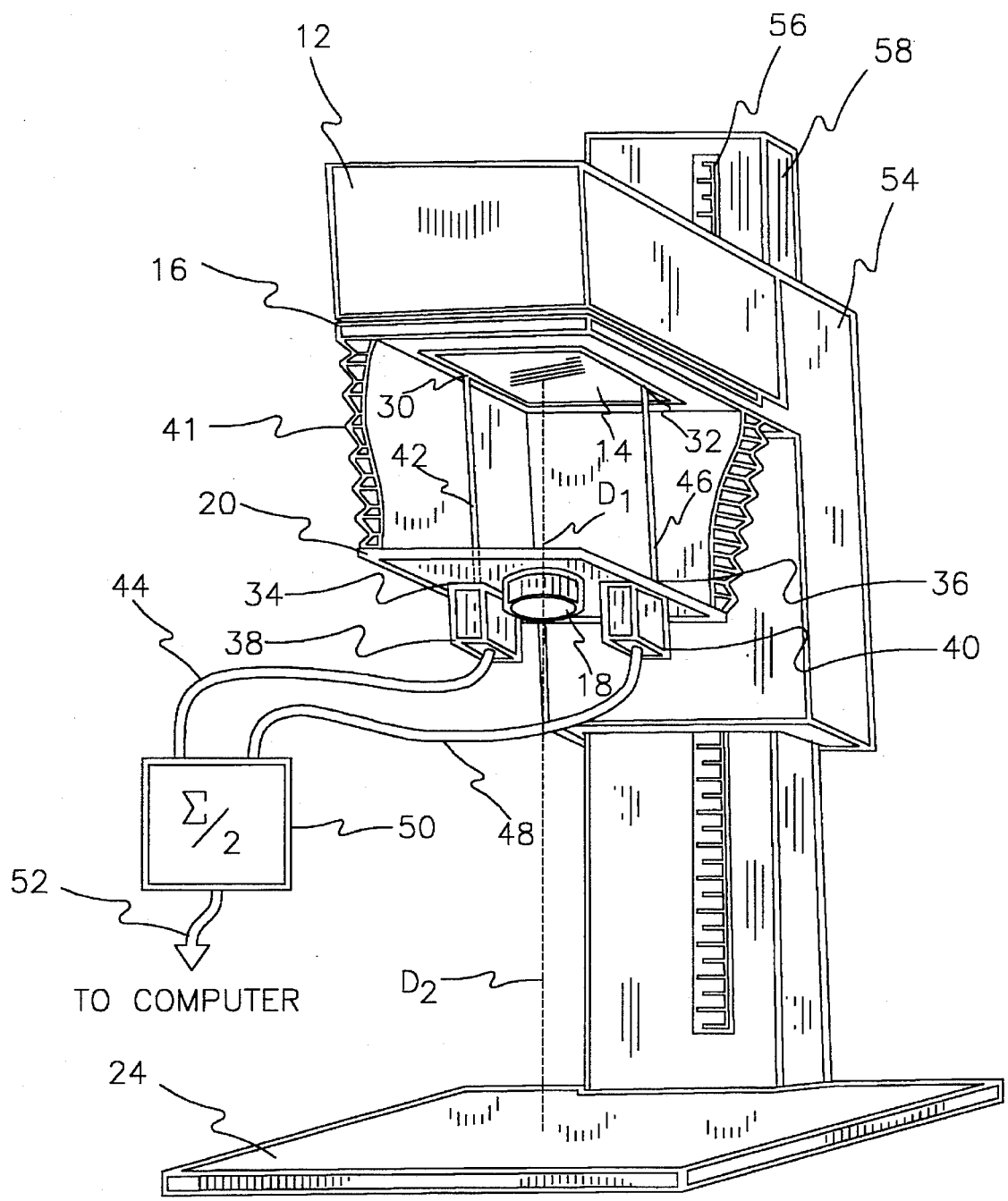
FIG. 2 is an isometric view of a photographic enlarger having a first focusing section comprised of two lens board displacement measuring devices and a calculation element for determining the actual lens position.

FIG. 2 is an isometric view of a preferred measurement apparatus embodiment in accordance with the present invention showing a cutaway view of a bellows 41 surrounding an assembly comprising the lens 18, the lens board 20 and the film stage 16. In this embodiment, a first inelastic flexible elongate member 42, e.g., a band, wire, chain, belt, cable, etc., is rigidly coupled to measurement point 30 and extends to measurement point 34 where the first measurement device 38 is mounted. The measurement device is comprised of a retraction device, e.g., a spring-loaded take-up reel, which extends or retracts the flexible elongate member 42 as the relative distance between the film stage 16 and the lens board 20 is altered and an encoder, e.g., an optical encoder, a potentiometer, etc., which determines the amount that the flexible elongate member extended or extracted. The encoder generates a signal on first signal wire 44 indicating the relative movement between measurement points 30 and 34. Similarly, the second measurement device 40 measures the relative movement between measurement points 32 and 36 using a second flexible elongate member 46 and generates a signal on second signal wire 48. Signal wires 44, 48 couple measurement signals to a signal averager 50 which sums and then divides by two, i.e., averages, the two signals, resulting in a signal on signal wire 52 indicative of the relative movement between the film transparency 14 and the lens optical center. After calibrating the apparatus to adjust for its geometry, the relative movement is adjusted by a fixed offset to determine the dimension $D_1$, as previously described. Signal wire 52 is coupled to a computer (not shown) which controls apparatus (not shown) which moves the lens board 20 to achieve a desired focus according to the measured dimension $D_1$. Alternatively, the measurement signals on signal wires 44, 48 can be coupled directly to the computer where they are averaged or summed. Measurement signals on signal wires 44, 48 from measurement devices 38, 40 are preferably digital or analog signals directly representative of distances. Alternatively, pulses or other signals representative of changes in distance, i.e., deltas, are coupled to the signal averager 50 or the computer where the signals are accumulated and adjusted by a fixed offset to generate a signal representative of distance.

In FIG. 2, only the structure for measuring the distance between the film stage 16 and the lens board 20 is shown. However, a similar structure is recognized as being useful for determining the distance between the lens board 20 and the print stage 24. A focus structure 54 comprised of the light source 12, the film stage 16, the lens 18 and the lens board 20 is coupled via a geared assembly (not shown) to a track 56 on a support column 58. The computer adjusts the geared assembly in response to the measured dimension $D_2$ between the lens board 20 and the print stage 24.

Alternatively, a photographic enlarger can be configured having independent control over the movement of the lens board 20 and the film stage 16 relative to the print stage 24. In this configuration, the track 56 is coupled to the support column 58 and the film stage 16 and the lens board 20 are independently coupled to the track 16. Thus, when the lens stage 20 moves along column 58 changing $D_2$, $D_1$ changes by the reverse of the change in $D_2$ since $D_1+D_2$ does not change. Similarly, when the film stage 16 moves along column 58 changing $D_1$, $D_2$ does not change. The present invention is similarly useful with this alternative photographic enlarger configuration.

The selection of the measurement means, e.g., flexible elongate members and optical encoders, is not determinative of the use of the disclosed method. Thus, this invention is intended to encompass other measurement means known to one of ordinary skill in the art, e.g., laser, ultrasonic measurement devices, etc. While devices that can directly determine an absolute distance measurement are desirable, it is recognized that relative movement measurements can be adjusted after calibrating or otherwise determining the geometry of the apparatus. Thus, relative movement measurement devices are equally useful in practicing the present invention.

Figure 3:
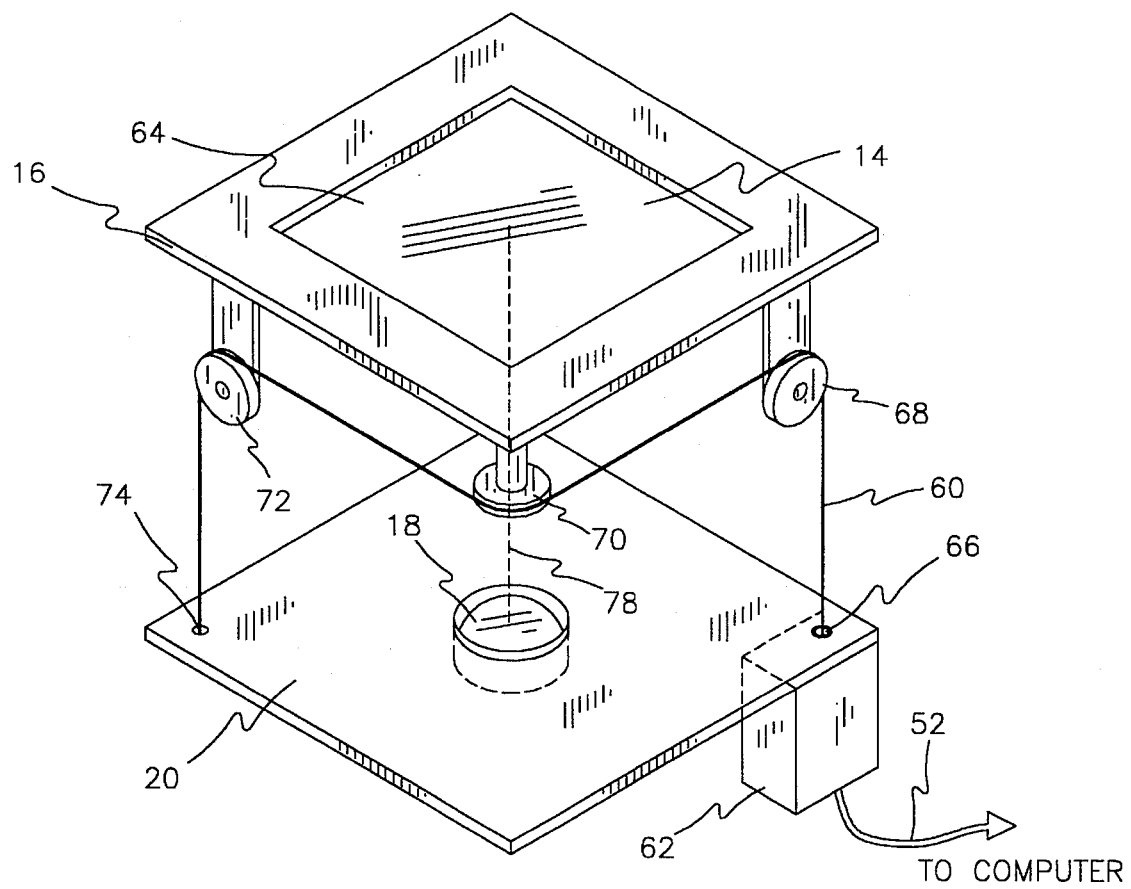
FIG. 3 is an isometric view of a second focusing section having a single measuring flexible elongate member to determine the actual lens position.

In an alternate embodiment shown in FIG. 3, a single measuring flexible elongate member 60 extends from a single measuring device 62, as previously described, for measuring the distance between the film transparency 14 sitting in a transparent recess 64 in the film stage 16 and the lens optical center. This embodiment is equally applicable for use in a photographic enlarge or printer as shown in FIG. 2. The measuring flexible elongate member 60 projects from a measurement point 66 up to a first pulley 68 located on the film stage 16. The flexible elongate member 60 routes around the first pulley 68, around a second pulley 70, and around a third pulley 72 to a termination point 74 where the flexible elongate member 60 is coupled to the lens board 20. The pulleys 68, 70, 72 are rigidly coupled to the film stage 16 offset by a predetermined fixed dimension. Thus, a fixed and compensable distance exists between the film transparency 14 and the pulleys 68, 72. The flexible elongate member path from the measuring device 62 to the pulley 68 is essentially parallel to the flexible elongate member path from the third pulley 72 to the termination point 74 and essentially parallel to the direction of motion of the lens board 20 and the film stage 16 along axis 78 through the lens optical center and the center of the film transparency 14. The position of the measurement point 66 where the flexible elongate member 60 extends from the measuring device 62 and the position of the flexible elongate member termination point 74 are equidistant and diametrically opposed to the lens optical center. As the lens board 20 moves relative to the film stage 16, the flexible elongate member 60 is drawn from (or retracted into) the measuring device 62. The measuring device 62 measures the amount of the flexible elongate member which is drawn into or retracted from it as previously described and generates a signal on signal wire 52 to a computer. Due to the geometry of the flexible elongate member paths, the amount of the flexible elongate member drawn (or retracted) from the measuring device 62 is exactly twice the distance moved by the center of the lens along axis 78. Further, if the lens board 20 fails to stay parallel to the film transparency 14, i.e., deflects, the measurement will still reflect the actual position of the lens optical center. Since no mechanical structure or mechanism is perfectly rigid, this deflection is a common occurrence as the lens board 20 and the film stage 16 are moved for the purpose of adjusting the size and focus of the projected image.

Although the present invention has been described in detail with reference to presently preferred embodiments, it is recognized that various modifications may occur to those skilled in the art without departing from the intended scope of the invention. Accordingly, the invention is defined by the following claims.

We claim:

1. A method of measuring relative linear movement between a first planar surface and a second planar surface, comprising the steps of:

selecting first and second measurement points proximate to said first planar surface essentially diametrically opposed and equidistant from a first reference point on said first planar surface;

selecting third and fourth measurement points proximate to said second planar surface essentially diametrically opposed and equidistant from a second reference point on said second planar surface;

measuring relative linear movement between said first and third measurement points to determine a first measurement value;

measuring relative linear movement between said second and fourth measurement points to determine a second measurement value; and computing a third measurement value representative of relative linear movement between said first and second reference points by averaging said first and second measurement values.

2. The method of claim 1, additionally comprising the step of adjusting the relative distance between said first and second planar surfaces in response to said third measurement value.

3. The method of claim 2, wherein said adjusting step adjusts the size of an image projected through a lens on said first planar surface onto said second planar surface.

4. The method of claim 2, wherein said adjusting step adjusts the focus of an image projected from said second planar surface through a lens on said first planar surface.

5. The method of claim 1, additionally comprising generating a fourth value representative of the relative distance between of said first and second planar surfaces by adjusting said third measurement value by a fixed value relative to the position of said first, second, third and fourth points.

6. The method of claim 1, wherein said selected first reference point is centrally located on said first planar surface.

7. An apparatus for measuring relative linear movement between first and second planar surfaces, comprising:

first and second measurement points diametrically opposed and equidistant from a first reference point proximate to said first planar surface;

third and fourth measurement points diametrically opposed and equidistant from a second reference point proximate to said second planar surface;

first measurement means for generating a first measurement signal corresponding to linear movement from said second measurement point to said fourth measurement point; and means for averaging said first and second measurement signals to determine a value indicative of relative linear movement from said first to said second reference points.

8. The apparatus of claim 7, additionally comprising means for adjusting said relative movement value by a fixed value relative to the position of said first, second, third and fourth points to determine a value representative of the relative distance between said first and second planar surfaces.

9. The apparatus of claim 7, wherein said first and second measurement points are separated a first distance from said first reference point and said third and fourth measurement points are separated a second distance from said second reference point, said first and second separation distances being essentially equal.

10. The apparatus of claim 7, wherein said first and second planar surfaces are moveable along an axis defined by said first and second measurement points.

11. The apparatus of claim 7, additionally comprising:

a lens centrally located on said first planar surface, said lens having an optical center corresponding to said first reference point; and means to receive a film transparency on said second planar surface, said film transparency having a center point corresponding to said second reference point.

12. The apparatus of claim 11, additionally comprising means for focusing said lens by adjusting the relative distance between said optical center of said lens and said center point of said film transparency in response to said averaging means.

13. The apparatus of claim 7, wherein said first measurement means comprises:

a first flexible elongate member rigidly coupled proximate to said second planar surface and extending to said first planar surface; and a first measurement device disposed proximate to said first planar surface wherein said measurement device receives said first flexible elongate member to measure relative linear movement between said first and second planar surfaces.

14. An apparatus for measuring the relative linear movement between a first planar surface and a second planar surface, comprising:

first and second measurement points diametrically opposed and equidistant from a first reference point proximate to said first planar surface;

third and fourth measurement points diametrically opposed and equidistant from a second reference point proximate to said second planar surface;

a measurement device coupled to said first planar surface proximate to said second measurement point to generate a relative movement signal;

a flexible elongate member coupled at a first end proximate to said first measurement point and at a second end to said measurement device proximate to said second measurement point;

flexible elongate member direction means for directing said flexible elongate member via third and fourth measurement points diametrically opposed and equidistant from said second reference point; and means for diverting said flexible elongate member to avoid an axis defined by said first and second reference points.

15. The apparatus of claim 14, wherein said flexible elongate member direction means comprises first and second pulleys for receiving said flexible elongate member.

16. The apparatus of claim 15, wherein said flexible elongate member diverting means comprises a third pulley for receiving said flexible elongate member wherein said flexible elongate member passes from said first pulley to said third pulley to said second pulley and the path of said flexible elongate member bypasses said second reference point.

17. The apparatus of claim 14, additionally comprising:

a lens centrally disposed proximate to said first planar surface; and a centrally located surface for receiving a film transparency disposed proximate to said second planar surface.

18. The apparatus of claim 14, additionally comprising:

a centrally located surface for receiving a film transparency disposed proximate to said first planar surface; and a lens centrally disposed proximate to said second planar surface.

19. The apparatus of claim 18, additionally comprising means to adjust the relative distance between said first and second planar surfaces in response to said relative movement signal.

* * * * *